(12) United States Patent
Kuramochi et al.

(10) Patent No.: US 11,608,076 B2
(45) Date of Patent: Mar. 21, 2023

(54) AGENT DEVICE, AND METHOD FOR CONTROLLING AGENT DEVICE

(71) Applicant: HONDA MOTOR CO., LTD., Tokyo (JP)

(72) Inventors: Toshikatsu Kuramochi, Tokyo (JP); Shinichi Kikuchi, Wako (JP); Hiroshi Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 351 days.

(21) Appl. No.: 16/785,697

(22) Filed: Feb. 10, 2020

(65) Prior Publication Data
US 2020/0262445 A1 Aug. 20, 2020

(30) Foreign Application Priority Data
Feb. 14, 2019 (JP) .............................. JP2019-024647

(51) Int. Cl.
*B60W 50/10* (2012.01)
*B60W 50/14* (2020.01)
*G10L 15/22* (2006.01)

(52) U.S. Cl.
CPC .......... *B60W 50/10* (2013.01); *B60W 50/14* (2013.01); *G10L 15/22* (2013.01); *B60W 2050/146* (2013.01); *B60W 2510/20* (2013.01); *B60W 2540/21* (2020.02); *B60W 2540/215* (2020.02); *G10L 2015/223* (2013.01)

(58) Field of Classification Search
USPC ................ 704/246, 247, 251, 252, 273, 275
See application file for complete search history.

(56) References Cited

U.S. PATENT DOCUMENTS

| | | | | |
|---|---|---|---|---|
| 2008/0269958 A1* | 10/2008 | Filev | ...................... | A61B 5/165 701/1 |
| 2014/0074483 A1* | 3/2014 | van Os | .................... | G10L 15/22 704/275 |
| 2014/0136013 A1* | 5/2014 | Wolverton | ............ | B60W 50/10 701/1 |
| 2018/0204569 A1* | 7/2018 | Nadkar | .................. | G10L 15/22 |
| 2018/0314689 A1* | 11/2018 | Wang | .................. | G10L 15/1822 |
| 2021/0316682 A1* | 10/2021 | Broy | ................... | B60R 16/0373 |

FOREIGN PATENT DOCUMENTS

| | | |
|---|---|---|
| JP | 2005-025100 | 1/2005 |
| JP | 2006-335231 | 12/2006 |
| WO | 2018/085671 | 5/2018 |

OTHER PUBLICATIONS

Japanese Office Action for Japanese Patent Application No. 2019-024647 dated Nov. 1, 2022.

* cited by examiner

*Primary Examiner* — Leonard Saint-Cyr
(74) *Attorney, Agent, or Firm* — Amin, Turocy & Watson, LLP

(57) ABSTRACT

An agent device includes: a plurality of agent function units, in which each of the agent function units provides a service including a voice response to an occupant of a vehicle in response to an utterance of the occupant; and a manager which, when any of the plurality of agent function units is being activated and the predetermined same operation is performed on the plurality of agent function units by the occupant of the vehicle, causes the agent function unit which is being activated to stop.

6 Claims, 7 Drawing Sheets

| AGENT NAME | SLEEP WORD |
|---|---|
| AGENT 1 | "STOP of AGENT 1" |
| AGENT 2 | "BYE BYE, AGENT 2" |
| AGENT 3 | "INTERACTION ENDS" |

AGENT DEVICE, AND METHOD FOR CONTROLLING AGENT DEVICE

Priority is claimed on Japanese Patent Application No. 2019-024647, filed Feb. 14, 2019, the content of which is incorporated herein by reference.

BACKGROUND

Field of the Invention

The present invention relates to an agent device, and a method for controlling an agent device.

Description of Related Art

Conventionally, a technology associated with an agent function in which information associated with driving support according to an occupant's request of a vehicle, control of a vehicle, other applications, and the like are provided while an interaction with the occupant is being performed has been described (Japanese Unexamined Patent Application, First Publication No. 2006-335231).

SUMMARY

In recent years, although practical use of installing a plurality of agent functions in a vehicle has been promoted, a method of stopping the agent functions in such a case has not been sufficiently researched. For this reason, in the related art, particularly, when a stopping method differs for each agent function, an occupant's complicated operation may be required in some cases.

An aspect of the present invention was made in view of such circumstances, and an object of the present invention is to provide an agent device, a method for controlling an agent device, and a storage medium which are capable of improving operability.

An agent device, and a method for controlling an agent device according to the present invention have the following constitution adopted therefor.

(1): An agent device according to an aspect of the present invention includes: a plurality of agent function units, in which each of the agent function units provides a service including a voice response to an occupant of a vehicle in response to an utterance of the occupant; and a manager which, when any of the plurality of agent function units is being activated and a predetermined same operation is performed on the plurality of agent function units by the occupant of the vehicle, causes the agent function unit which is being activated to stop.

(2) In the aspect of (1), an individual termination method is set for each of the plurality of agent function units, and when the predetermined operation is performed by the occupant of the vehicle, the manager pseudo-executes an individual termination method associated with the agent function unit which is being activated so that the agent function unit which is being activated stops.

(3): In the aspect of (1), the manager sets some or all of the plurality of agent function units to be in a state in which some or all of the plurality of agent function units are able to receive the occupant's utterance when none of the plurality of agent function units has started-up and the predetermined operation has been performed by the occupant of the vehicle.

(4): In the aspect of (1), the predetermined operation includes operating a physical operation unit in a vehicle compartment.

(5): In the aspect of (4), the operation unit is provided in a steering wheel of the vehicle.

(6) In the aspect of (1), the vehicle has a display unit configured to display an image associated with the agent function unit which is being activated provided therein.

(7): An agent device according to another aspect of the present invention includes: a plurality of agent function units, wherein each of the plurality of agent function units provides a service including a voice response in accordance with an utterance of an occupant of a vehicle, and in a case in which the agent function unit itself is being activated, when a predetermined common operation has been performed on the plurality of agent function units by the occupant of the vehicle, operation thereof is stopped.

(8): A method for controlling an agent device according to yet another aspect of the present invention causes a computer to start-up any of a plurality of agent function units; to provide a service including a voice response, as a function of the agent function unit which has been started-up, in accordance with an utterance of an occupant of a vehicle; and to cause the agent function unit which is being activated to stop when any of the plurality of agent function units is being activated and a predetermined common operation is performed on the plurality of agent function units by the occupant of the vehicle.

According to the aspects (1) to (8), it is possible to improve operability.

DESCRIPTION OF EMBODIMENTS

Embodiments of an agent device, a method for controlling an agent device, and a program of the present invention will be described below with reference to the drawings. The agent device is a device in which a part or all of an agent system is realized. As an example of the agent device, an agent device which is installed in a vehicle (hereinafter referred to as a "vehicle M") and includes agent functions of a plurality of types will be described below. The agent functions include, for example, a function of providing various information based on a request (a command) included in an utterance of an occupant of the vehicle M while an interaction with the occupant is being performed and mediating a network service. Agents of a plurality of types may have different functions, processing procedures, controls, and output states/contents to be carried out by each thereof. Some of the agent functions may have a function of controlling apparatuses in the vehicle (for example, apparatuses associated with driving control and vehicle body control).

The agent functions are realized by integrally utilizing, for example, a natural language processing function (a function for understanding a structure and a meaning of text), a dialog management function, a network retrieval function for retrieving another device over a network or retrieving a predetermined database included in a subject device, and the like in addition to a voice recognition function for recognizing the occupant's voice (a function for converting voice into text). Some or all of these functions may be realized using an artificial intelligence (AI) technology. A part of a constitution configured to perform these functions (particularly, a voice recognition function and a natural language processing interpretation function) may be installed in an agent server (an external device) capable of communicating with the in-vehicle communication device for the vehicle M or a general-purpose communication device brought into the vehicle M. In the following description, it is assumed that a part of the constitution is installed in the agent server and the agent system is realized through cooperation of the agent device with the agent server. Service providing entities (service entities) which virtually appear through cooperation of the agent device with the agent server are referred to as "agents." The agent service providing entities may be one or more agent providing entities or may be a different providing entities for each agent.

<Overall Constitution>

Figure 1:
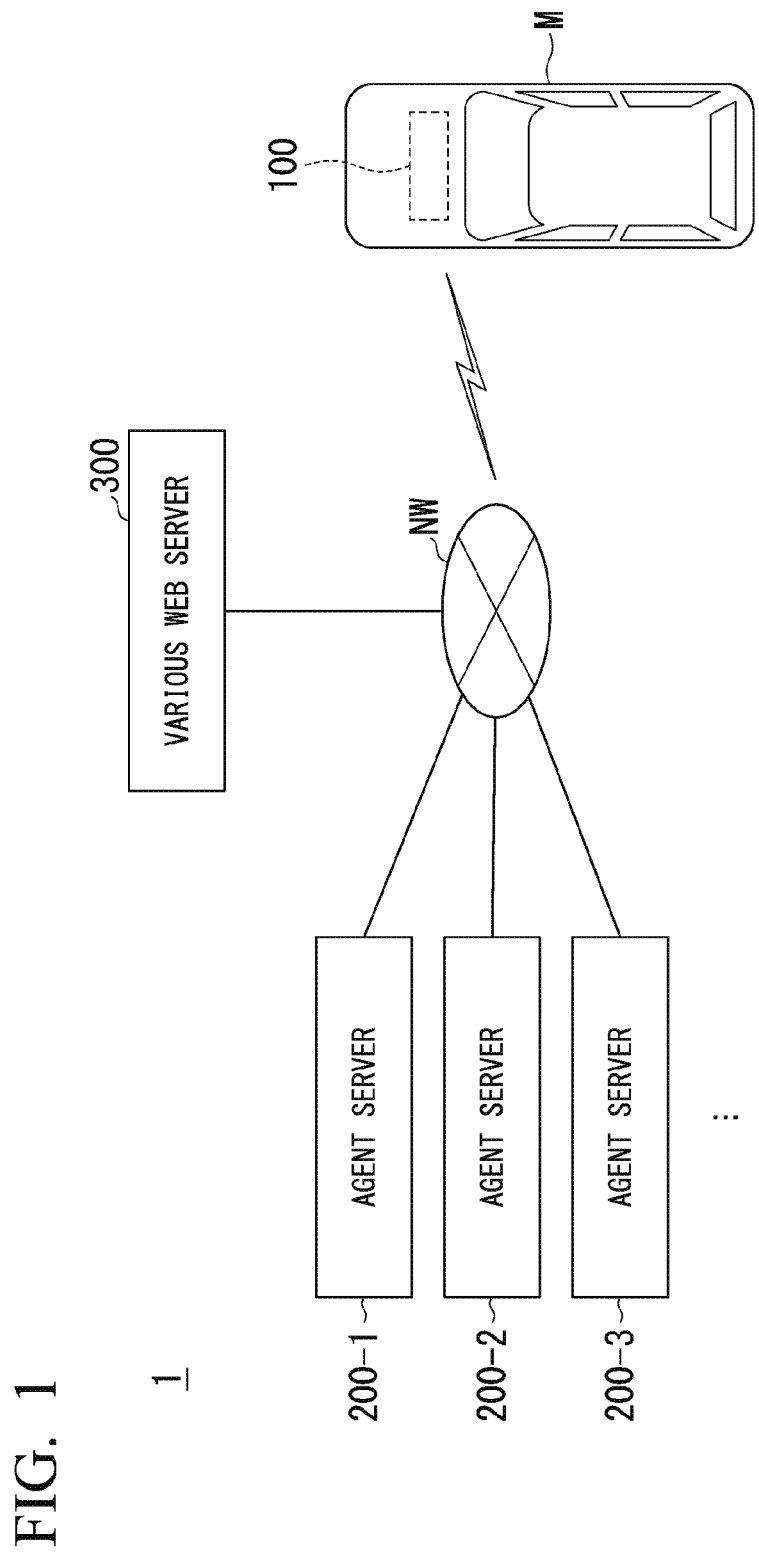
FIG. 1 is a diagram illustrating a constitution of an agent system including an agent device.

FIG. 1 is a constitution diagram of an agent system 1 including an agent device 100. The agent system 1 includes, for example, the agent device 100 and a plurality of agent servers 200-1, 200-2, 200-3, . . . . It may be assumed that a number appended with a hyphen after a reference numeral is an identifier used for distinguishing an agent. When it is not necessary to distinguish between agent servers, the agent servers may be simply referred to as "agent servers 200" in some cases. Although FIG. 1 illustrates three agent servers 200, the number of agent servers 200 may be two or four or more. The agent servers 200 are operated by providers of different agent systems. Therefore, the agent in the present invention is an agent realized by different providers. Examples of providers include automobile manufacturers, network service providers, electronic-commerce providers, mobile terminal sellers and manufacturers, and the like. In addition, any entities (corporations, organizations, individuals, and the like) can be the providers of the agent system.

The agent device 100 communicates with the agent servers 200 over a network NW. The network NW includes, for example, some of all of the Internet, a cellular network, a Wi-Fi network, a wide area network (WAN), a local area network (LAN), a public line, a telephone line, a wireless base station, and the like. Various web servers 300 are connected to the network NW and the agent servers 200 or the agent device 100 can obtain web pages from the various web servers 300 over the network NW.

The agent device 100 interacts with the occupant of the vehicle M, transmits voice from the occupant to the agent servers 200, and presents an answer obtained from each of the agent servers 200 to the occupant in the form of voice output or image display.

[Vehicle]

Figure 2:
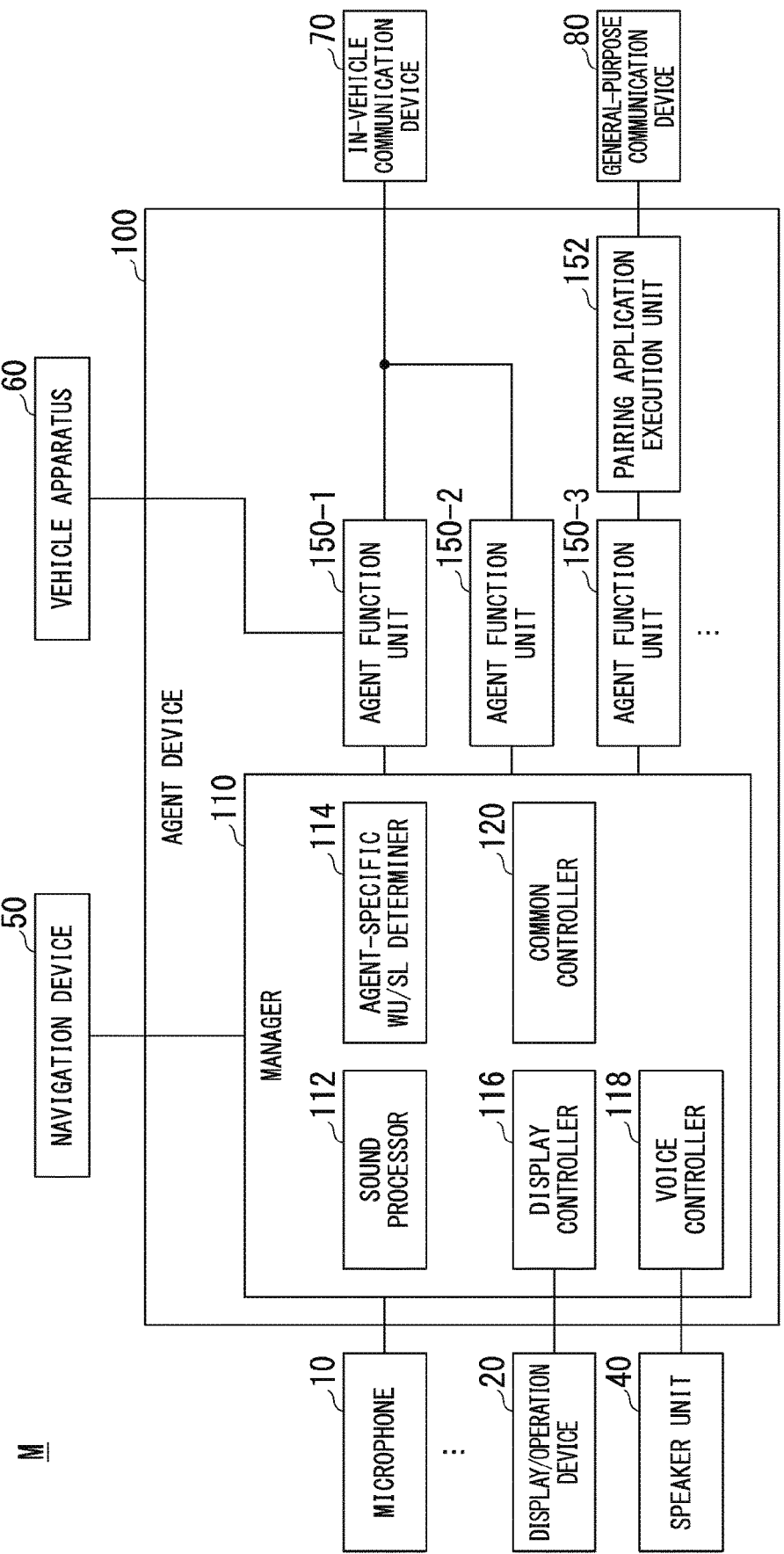
FIG. 2 is a diagram illustrating a constitution of an agent device according to an embodiment and apparatuses installed in a vehicle.

FIG. 2 is a diagram illustrating a constitution of the agent device 100 according to the embodiment and apparatuses installed in the vehicle M. The vehicle M includes, for example, one or more microphones 10, a display/operation device 20, a speaker unit 40, a navigation device 50, a vehicle apparatus 60, an in-vehicle communication device 70, and the agent device 100 installed therein. A general-purpose communication device 80 such as a smartphone may be brought into a vehicle compartment and used as a communication device in some cases. These devices are connected to each other over a multiplex communication line such as a controller area network (CAN) communication line, a serial communication line, a wireless communication network, or the like. The constitution illustrated in FIG. 2 is merely an example and a part of the constitution may be omitted or other components may be added thereto.

The microphones 10 are voice collection units configured to collect voice emitted in the vehicle compartment. The display/operation device 20 is a device (or a device group) which is capable of displaying an image and receiving an input operation. The display/operation device 20 includes, for example, a display device configured as a touch panel. The display/operation device 20 may further include a head up display (HUD) or a mechanical type input device. The speaker unit 40 includes, for example, a plurality of speakers (voice output units) arranged at different positions in the vehicle compartment. The display/operation device 20 may be used by both of the agent device 100 and the navigation device 50. Details of these will be described later.

The navigation device 50 includes a navigation human machine interface (HMI), a position positioning device such as a global positioning system (GPS), a storage device configured to store map information, and a control device (a navigation controller) configured to perform route searching or the like. Some or all of the microphones 10, the display/operation device 20, and the speaker unit 40 may be used as a navigation HMI. The navigation device 50 retrieves a route (a navigation route) for performing movement from a position of the vehicle M identified using the position positioning device to a destination place input by the occupant and outputs guide information using the navigation HMI so that the vehicle M can travel along the route. The route searching function may be provided in a navigation server which is accessible over the network NW. In this case, the navigation device 50 obtains a route from the navigation server and outputs guide information. The agent device 100 may be constituted using the navigation controller as a base. In addition, in this case, the navigation controller and the agent device 100 are integrally constituted in hardware.

The vehicle apparatus 60 includes, for example, a driving force output device such as an engine and a traveling motor, an engine starting-up motor, a door locking device, a door opening/closing device, windows, a window opening/closing device, a window opening/closing control device, seats, a seat position control device, a rearview mirror, an angular position control device of the rearview mirror, lighting devices inside and outside the vehicle, a control device for the lighting devices, wipers, a defogger, a control device for the wipers and the defogger, direction indicators, a control device for the direction indicators, an air conditioning device, a vehicle information device for information concerning a travel distance and a tire air pressure and information concerning the remaining fuel, and the like.

The in-vehicle communication device 70 is, for example, a wireless communication device which is accessible to the network NW using a cellular network or a Wi-Fi network.

Figure 3:
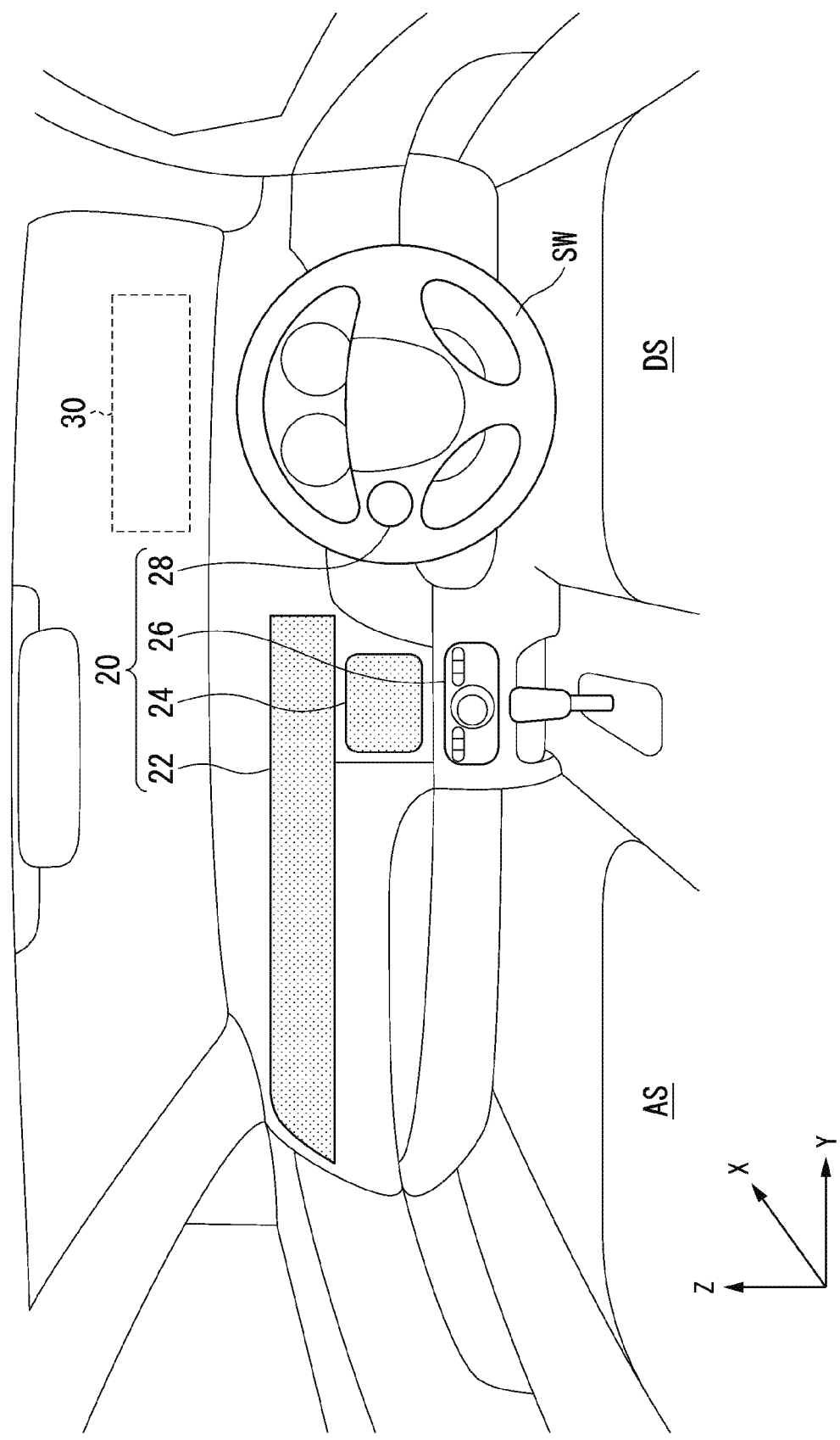
FIG. 3 is a diagram illustrating an example of an arrangement of a display/operation device.

FIG. 3 is a diagram illustrating an example of an arrangement of the display/operation device 20. The display/operation device 20 may include, for example, a first display 22, a second display 24, an operation switch ASSY 26, and a steering switch 28. The display/operation device 20 may further include an HUD 30.

The vehicle M includes, for example, a driver seat DS having a steering wheel SW provided thereat and an assistant seat AS provided in a vehicle width direction (a Y direction in the drawing) with respect to the driver seat DS. The first display 22 is a horizontally long display device which extends from the vicinity of the middle of an instrument panel between the driver seat DS and the assistant seat AS to a position thereof facing a left end portion of the assistant seat AS. The second display 24 is provided around the middle between the driver seat DS and the assistant seat AS in the vehicle width direction and below the first display 22. For example, the first display 22 and the second display 24 are both configured as touch panels and include a liquid crystal display (LCD), an organic electroluminescence (EL), a plasma display, or the like as display units. The operation switch ASSY 26 includes a dial switch, a button type switch, and the like integrated therein. The steering switch 28 is installed in the steering wheel SW of the vehicle M. The steering switch 28 is an example of a physical operation unit in the vehicle compartment. The display/operation device 20 outputs the details of an operation performed by the occupant to the agent device 100. The content displayed by the first display 22 or the second display 24 may be determined by the agent device 100.

[Agent Device]

Referring to FIG. 2 again, the agent device 100 includes a manager 110, agent function units 150-1, 150-2, and 150-3, and a pairing application execution unit 152. The manager 110 includes, for example, a sound processor 112, an agent-specific wake up (WU)/sleep (SL) determiner 114, a display controller 116, a voice controller 118, and a common controller 120. When it is not necessary to distinguish between agent function units, the agent function units may be simply referred to as an "agent function unit 150 or agent function units 150" in some cases. The illustration of three agent function units 150 is merely an example corresponding to the number of agent servers 200 and the number of agent function units 150 may be two or four or more. The software arrangement illustrated in FIG. 2 is simply illustrated for the sake of explanation and in practice can be modified arbitrarily, for example, so that the manager 110 is not located between the agent function units 150 and the in-vehicle communication device 70.

Constituent elements of the agent device 100 are realized, for example, through a program (software) executed by a hardware processor such as a central processor (CPU). Some or all of these constituent elements may be realized through hardware (including a circuit unit; a circuitry) such as a large scale integration (LSI), an application specific integrated circuit (ASIC), a field-programmable gate array (FPGA), and a graphics processor (GPU) and may be realized through cooperation of software with hardware. A program may be stored in a storage device such as a hard disk drive (HDD) and a flash memory (a storage device including a non-transitory storage medium) in advance, stored in an attachable/detachable storage medium such as a DVD and a CD-ROM (a non-transitory storage medium), or installed when a storage medium is installed in a drive device.

The manager 110 functions by executing a program such as an operating system (OS) and middleware.

The sound processor 112 in the manager 110 performs sound processing on input voice so that the input voice is brought into a state which is appropriate for recognizing a wake-up word or a sleep word set in advance for each agent.

The agent-specific WU/SL determiner 114 is present to correspond to each of the agent function units 150-1, 150-2, and 150-3 and recognizes the wake-up word or the sleep word which is determined in advance for each agent. A sleep word is an example of an individual termination method set in each of the plurality of agent function units 150. The agent-specific WU/SL determiner 114 recognizes the meaning of voice (a voice stream) which has been subjected to sound processing from the voice. First, the agent-specific WU/SL determiner 114 detects a voice section on the basis of an amplitude and zero crossing of a voice waveform in the voice stream. The agent-specific WU/SL determiner 114 may perform section detection based on voice identification and non-voice identification in frame units based on a Gaussian mixture model (GMM).

Subsequently, the agent-specific WU/SL determiner 114 converts voice in the detected voice section into text and uses the text as character information. Furthermore, the agent-specific WU/SL determiner 114 determines whether the character information which has been converted into text corresponds to a wake-up word. When it is determined that the character information is the wake-up word, the agent-specific WU/SL determiner 114 starts-up a corresponding agent function unit 150 among the agent function units 150. The agent-specific WU/SL determiner 114 determines whether the character information which has been converted into text corresponds to a sleep word. When it is determined that the character information is the sleep word, the agent-specific WU/SL determiner 114 stops a function of a corresponding agent function unit 150 among the agent function units 150. A function corresponding to the agent-specific WU/SL determiner 114 may be installed in the agent server 200. In this case, the manager 110 transmits the voice stream which has been subjected to sound processing using the sound processor 112 to the agent servers 200 and controls starting-up of the agent function units 150 in accordance with instructions from the agent servers 200 when the agent server 200 determines that the voice stream is a wake-up word or a sleep word. Each of the agent function units 150 may always be activated and may perform determination concerning a wake-up word or a sleep word by itself. In this case, the manager 110 does not need to include the agent-specific WU/SL determiner 114.

The agent function units 150 causes an agent to appear in cooperation with a corresponding agent server 200 among the agent servers 200 and provides a service including a voice response in accordance with an utterance of an occupant in the vehicle. The agent function units 150 may include an agent function unit to which authority to control the vehicle apparatus 60 has been provided. The agent function units 150 may include an agent function unit which cooperates with the general-purpose communication device 80 via the pairing application execution unit 152 and communicates with the agent servers 200. For example, authority to control the vehicle apparatus 60 is provided to the agent function unit 150-1. The agent function unit 150-1 communicates with the agent server 200-1 via the in-vehicle communication device 70. The agent function unit 150-2 communicates with the agent server 200-2 via the in-vehicle communication device 70. The agent function unit 150-3 cooperates with the general-purpose communication device 80 via the pairing application execution unit 152 and communicates with the agent server 200-3. The pairing application execution unit 152 performs pairing with the general-purpose communication device 80 using, for example, Bluetooth (registered trademark) and connects the agent function unit 150-3 to the general-purpose communication device 80. The agent function unit 150-3 may be connected to the general-purpose communication device 80 through wired communication using a universal serial bus (USB) or the like. Hereinafter, an agent which is appeared using the agent function unit 150-1 and the agent server 200-1 in cooperation may be referred to as Agent 1, an agent which is appeared using the agent function unit 150-2 and the agent server 200-2 in cooperation may be referred to as Agent 2, and an agent which is appeared using the agent function unit 150-3 and the agent server 200-3 in cooperation may be referred to as Agent 3 in some cases.

The display controller 116 causes the first display 22 or the second display 24 to display an image in response to an instruction from the agent function units 150. Hereinafter, it is assumed that the first display 22 is used. Under the control of the agent function units 150, the display controller 116 generates, for example, an image of an anthropomorphic agent which communicates with the occupant in the vehicle compartment (hereinafter referred to as an "agent image") and causes the generated agent image to be displayed on the first display 22. The agent image is an example of an image associated with the agent function unit 150 which is being activated. The agent image is, for example, an image in a state of talking to the occupant. The agent image may include, for example, at least a face image whose facial expression and face direction are recognized by a viewer (an occupant). For example, the agent image may have parts simulating eyes and a nose represented in a face region and be an agent image whose facial expression and face direction may be recognized on the basis of positions of these parts in the face region. The agent image may be experienced three-dimensionally and a face direction of an agent may be recognizable by the viewer by including an image of a head portion in a three-dimensional space, or an operation, a behavior, a posture, and the like of an agent may be recognizable by the viewer by including an image of a main body (a body and limbs). The agent image may be an animated image.

The voice controller 118 causes some or all of the speakers included in the speaker unit 40 to output voice in response to instructions from the agent function units 150. The voice controller 118 may perform control so that a sound image of an agent voice is localized at a position corresponding to a display position of the agent image using the plurality of speaker units 40. The position corresponding to the display position of the agent image is, for example, a position from which the occupant is expected to feel the agent voice of the agent image should speak, specifically, a position in the vicinity of the display position of the agent image. The sound image is positioned, for example, by adjusting the loudness of sound transmitted to the left and right ears of the occupant to determine a spatial position of a sound source experienced by the occupant.

The common controller 120 outputs a command to the plurality of agent function units 150 when a predetermined common command operation is performed by the occupant of the vehicle M in a case in which none of the agent function units 150 starts-up. When the agent function units 150 receive a command from the common controller 120, the agent function units 150 enter a state in which the utterance of occupant is received. In this case, an agent to start-up may be an agent which has started-up last. The common controller 120 stops the function of the agent function unit 150 which is being activated when a predetermined common command operation is performed by the occupant of the vehicle M during starting-up of any of the agent function units 150. The predetermined common command operation is a common operation regardless of types of the agent function units 150, for example, an operation or the like of the steering switch 28. The predetermined common command operation is an operation for receiving an instruction from the occupant with respect to the plurality of agent function units 150 and is to the same as an operation performed when the agent function units 150 start-up. Even in the case of the same common command operation, the control contents performed by the common controller 120 differ in accordance with starting-up states of the agent function units 150. When there are a plurality of agent function units 150 which are being activated, the common controller 120 stops the functions of all of the agent function units 150 which are being activated. The common controller 120 stops the functions of the agent function units 150 which are being activated to stop display of an agent image generated using the display controller 116 under the control of the agent function units 150. Each of the plurality of agent function units 150 may stop an operation when a predetermined common command operation is performed by the occupant of the vehicle M in a case in which the agent function unit 150 itself is being activated.

Figures 4, 5:
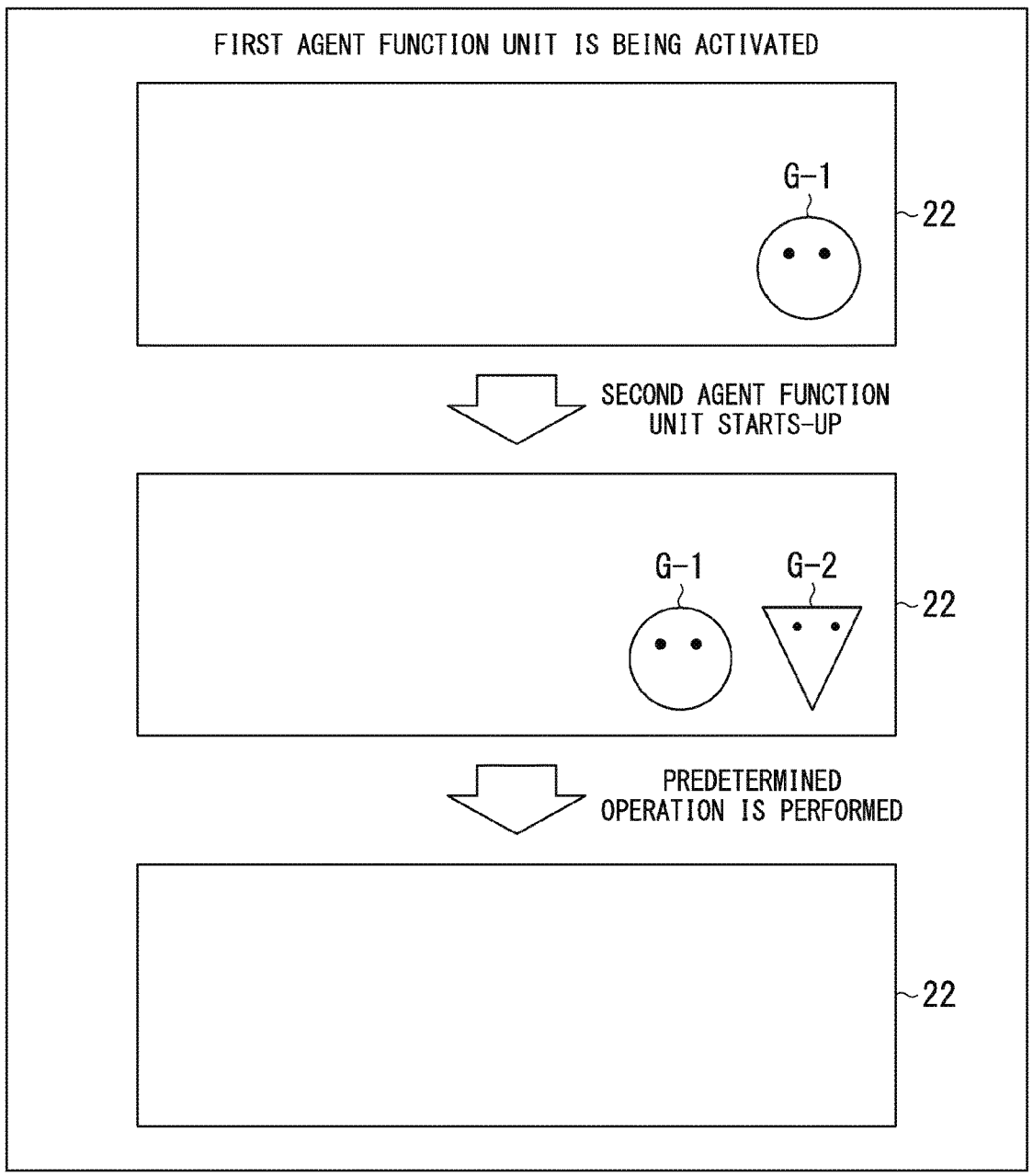
FIG. 4 is a diagram illustrating an example of a sleep word set for each agent.
FIG. 5 is a diagram for explaining an example of an agent image.

FIG. 4 is a diagram illustrating an example of a sleep word set in each of the plurality of agent function units 150. In the example illustrated in FIG. 4, a sleep word corresponding to Agent 1 is "Stop of Agent 1," a sleep word corresponding to Agent 2 is "Bye bye; Agent 2," and a sleep word corresponding to Agent 3 is "Interaction ends." In this example, the sleep words corresponding to Agents 1 to 3 are different from each other.

When a predetermined common command operation is performed, the common controller 120 stops the function of an agent function unit 150 which is being activated by, for example, pseudo-executing an individual termination method. The common controller 120 first identifies an agent function unit 150 which is being activated among the plurality of agent function units 150 as a pseudo-execution of the individual termination method. Subsequently, the common controller 120 obtains sleep words corresponding to the identified agent function units 150. Furthermore, the common controller 120 controls the voice controller 118 so that voice of the obtained sleep words is synthesized and output through the speaker units 40. The voice of the sleep word output through the speaker unit 40 is input to the manager 110 through the microphones 10. In addition, the agent-specific WU/SL determiner 114 recognizes the input sleep words to stop the function of the agent function unit 150 which is being activated. The common controller 120 may output a command to the agent-specific WU/SL determiner 114, as the pseudo-execution of the individual termination method, so that processing is performed under the assumption that an agent-specific WU/SL determiner 114 has recognized a sleep word corresponding to the agent function unit 150 which is being activated. When the function of the agent function unit 150 which is being activated stop, the display controller 116 stops display of the agent image generated under the control of the agent function units 150.

FIG. 5 is a diagram for explaining an example of the agent image. In the example illustrated in FIG. 5, for example, when the first agent function unit 150-1 is being activated, the display controller 116 displays an agent image G-1 obtained by anthropomorphizing Agent 1 on the first display 22. Subsequently, when the second agent function unit 150-2 starts-up in conjunction with the first agent function units 150-1, the display controller 116 causes an agent image G-2 obtained by anthropomorphizing Agent 2 on the first display 22 together with the agent image G-1 obtained by anthropomorphizing Agent 1. That is to say, when the plurality of agent function units 150-1 and 150-2 are being activated, the display controller 116 causes the agent images G-1 and G-2 corresponding to the agent function units 150-1 and 150-2 to be displayed on the first display 22. Subsequently, when a predetermined common command operation is performed by the occupant of the vehicle M, the display controller 116 stops the functions of the agent function units 150-1 and 150-2 which are being activated and stops display of the agent images G-1 and G-2 corresponding to the agent function units 150-1 and 150-2 which are being activated.

[Agent Server]

Figure 6:
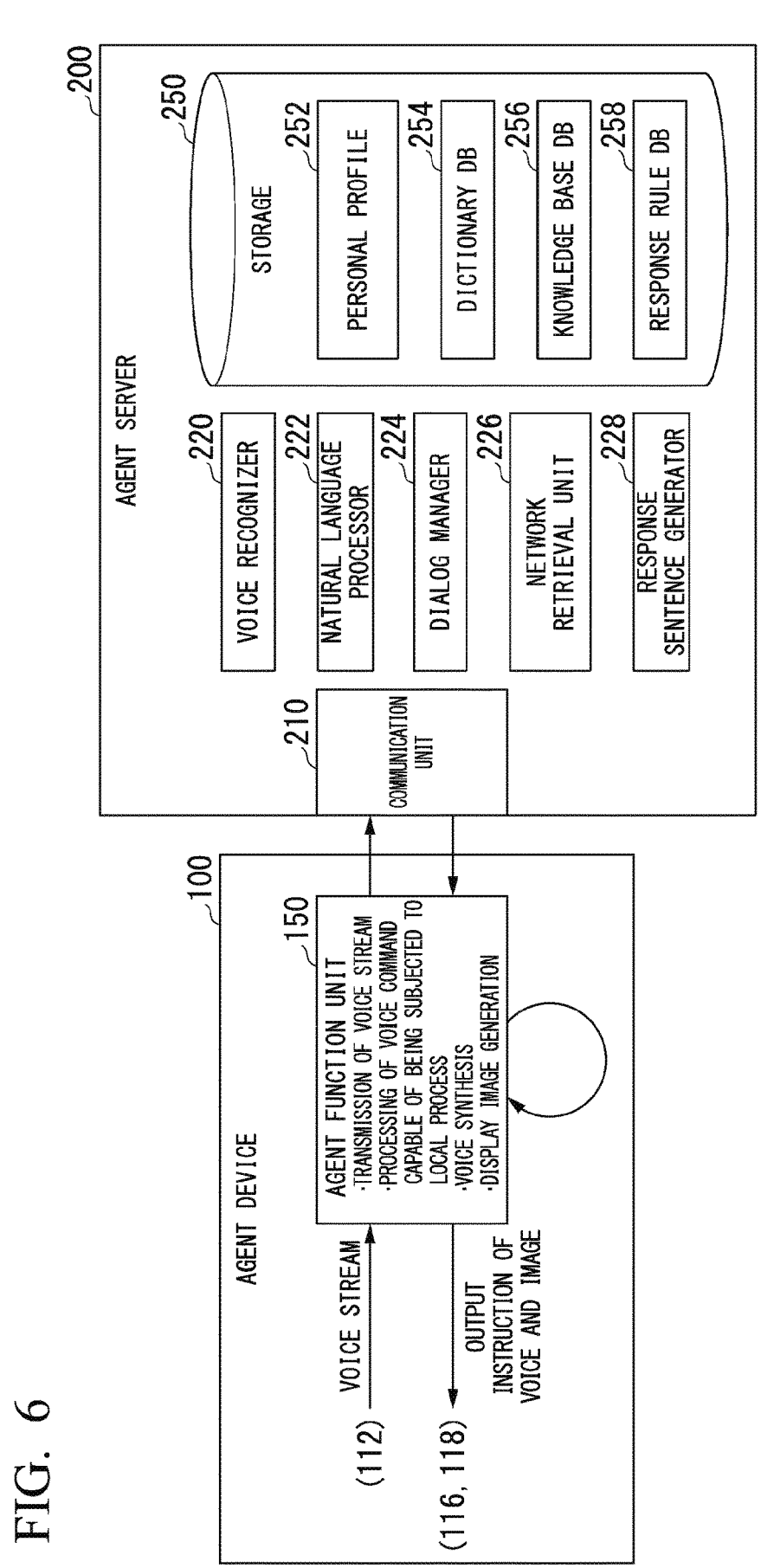
FIG. 6 is a diagram illustrating a constitution of an agent server and a part of a constitution of the agent device.

FIG. 6 is a diagram illustrating a constitution of each of the agent servers 200 and a part of a constitution of the agent device 100. The constitution of the agent server 200 and an operation of each of the agent function units 150 or the like will be described below. Here, description of physical communication from the agent device 100 to the network NW will be omitted.

The agent server 200 includes a communication unit 210. The communication unit 210 is, for example, a network interface such as an network interface card (NIC). Furthermore, the agent server 200 includes, for example, a voice recognizer 220, a natural language processor 222, a dialog manager 224, a network retrieval unit 226, and a response sentence generator 228. These constituent elements are realized through a program (software) executed using, for example, a hardware processor such as a CPU. Some or all of these constituent elements may be realized through hardware (including a circuit unit; a circuitry) such as LSI, ASIC, FPGA, and GPU and may be realized through cooperation of software with hardware.

A program may be stored in a storage device such as an HDD and a flash memory (a storage device including a non-transitory storage medium) in advance, stored in an attachable/detachable storage medium such as a DVD and a CD-ROM (a non-transitory storage medium), or installed when a storage medium is installed in a drive device.

The agent server 200 includes a storage 250. The storage 250 is realized through the various storage devices. The storage 250 stores data and a program of a personal profile 252, a dictionary database (DB) 254, a knowledge base DB 256, a response rule DB 258, and the like.

In the agent device 100, the agent function unit 150 transmits a voice stream or a voice stream which has been subjected to processing such as compression or encoding to the agent server 200. The agent function unit 150 may perform a process requested through a voice command when recognizing a voice command which is capable of being subjected to a local process (a process in which the agent server 200 is not intervened). The voice command which is capable of being subjected to a local process is a voice command which is capable of receiving an answer with reference to a storage (not shown) included in the agent device 100 or a voice command used for controlling the vehicle apparatus 60 (for example, a command to turn on the air conditioning device and the like) in the case of the agent function unit 150-1. Therefore, the agent function unit 150 may have some of the functions of the agent servers 200.

If a voice stream is obtained, the voice recognizer 220 performs voice recognition on the voice stream and outputs character information obtained by converting the voice stream into text, and the natural language processor 222 performs semantic interpretation on the character information with reference to the dictionary DB 254. The dictionary DB 254 associates abstracted meaning information with the character information. The dictionary DB 254 may include list information of synonyms and near-synonyms. Stages of processing of the voice recognizer 220 and processing of the natural language processor 222 are not clearly divided and the processing of the voice recognizer 220 and the processing of the natural language processor 222 may be performed while interacting with each other so that the voice recognizer 220 receives the processing result of the natural language processor 222 and corrects the recognition result.

For example, when the meanings of the expressions "How's the weather today?," "How's the weather?," and the like are recognized as a recognition result, the natural language processor 222 generates a command replaced with standard character information "today's weather." Thus, it is possible to easily perform a dialog on request even when request voice has character fluctuations. The natural language processor 222 may recognize the meaning of the character information using, for example, artificial intelligence processing such as machine learning processing using probabilities or may generate a command based on the recognition result.

The dialog manager 224 determines the content of the utterance with respect to the occupant of the vehicle M with reference to the personal profile 252, the knowledge base DB 256, and the response rule DB 258 on the basis of the processing result (a command) of the natural language processor 222. The personal profile 252 includes personal information, hobbies and preferences, a history of past conversations, and the like of the occupant stored for each occupant. The knowledge base DB 256 includes information which defines a relationship between things. The response rule DB 258 includes information which defines an operation (such as the contents of an answer and apparatus control) to be performed on a command by an agent.

The dialog manager 224 may perform collation with the personal profile 252 using feature information obtained from the voice stream to identify the occupant. In this case, in the personal profile 252, for example, personal information is associated with voice feature information. The voice feature information includes, for example, information associated with a feature quantity due to characteristics of a speaking style such as a voice volume, an intonation, and a rhythm (a pattern of a voice pitch), a Mel frequency cepstrum coefficient, and the like. The voice feature information is, for example, information obtained by causing the occupant to utter a predetermined word or sentence at the time of initial registration and recognizing the uttered voice.

When a command requests information which can be retrieved over the network NW, the dialog manager 224 causes the network retrieval unit 226 to retrieve. The network retrieval unit 226 accesses various web servers 300 over the network NW and obtains desired information. The "information which can be retrieved over the network NW" includes, for example, an evaluation result due to a general user of a restaurant in the vicinity of the vehicle M or weather forecast according to a position of the vehicle M on that day.

The response sentence generator 228 generates a response sentence so that the content of the utterance determined using the dialog manager 224 is transmitted to the occupant of the vehicle M and transmits the generated response sentence to the agent device 100. When it is identified that the occupant is an occupant who has been registered in the personal profile, the response sentence generator 228 may call the occupant's name or generate a response sentence having a speaking style similar to that of the occupant.

The agent function unit 150 instructs the voice controller 118 to perform voice synthesis on the response sentence and output voice when obtaining the response sentence. The agent function unit 150 instructs the display controller 116 to display an image of the agent in accordance with the voice output. In this way, an agent function in which an agent appearing virtually responds to the occupant of the vehicle M is realized.

[Processing Flow of Agent Device]

Figure 7:
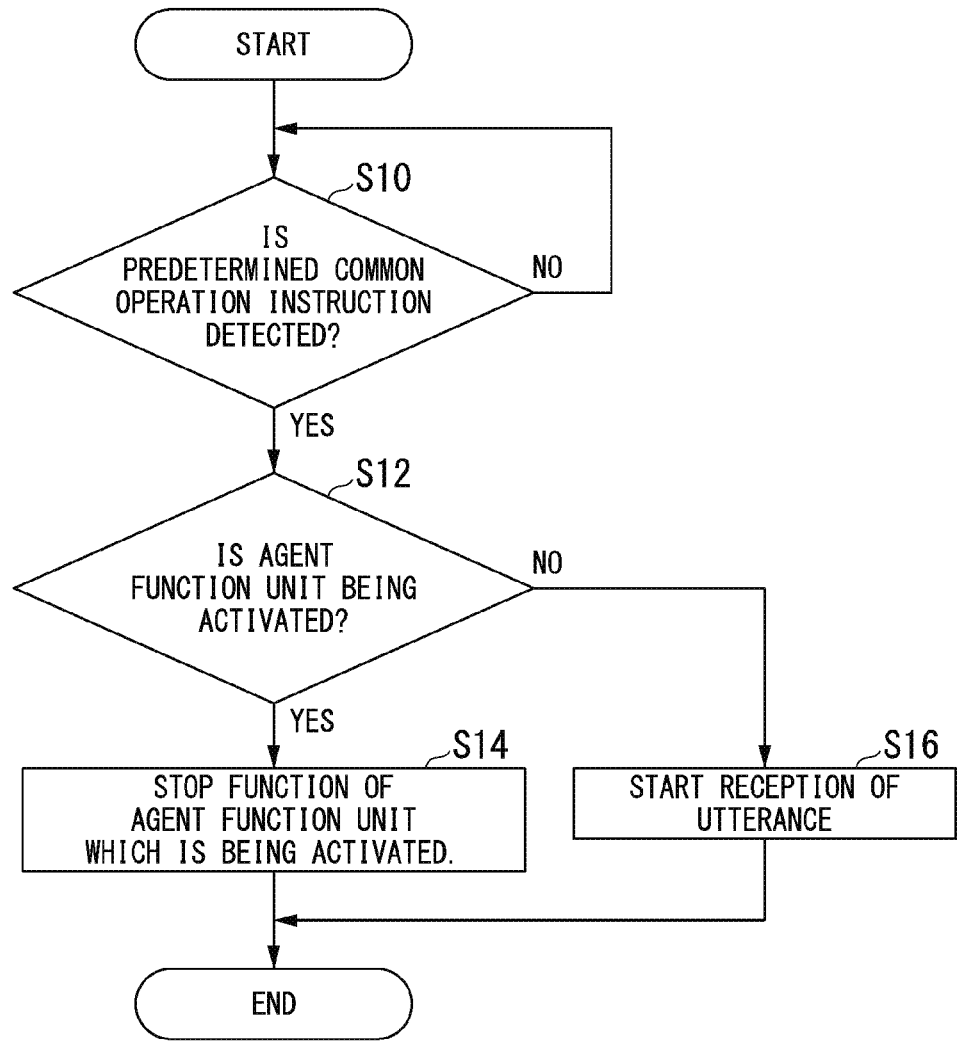
FIG. 7 is a flowchart for explaining a flow of a series of processes of an agent device according to an embodiment.

A flow of a series of processes of the agent device 100 according to the embodiment will be described below using a flowchart. FIG. 7 is a flowchart for describing a flow of the process of the agent device 100 according to the embodiment. The process of this flowchart may be repeatedly performed at a predetermined cycle.

First, the common controller 120 determines whether a predetermined common command operation has been detected (Step S10). When it is determined that the predetermined common command operation has been detected, the common controller 120 determines whether the agent function unit 150 is being activated (Step S12). When it is determined that the agent function units 150 is being activated, the common controller 120 stops the function of the agent function unit 150 which is being activated (Step S14). Here, the process of this flowchart ends.

On the other hand, when it is determined that the agent function units 150 are not being activated, the common controller 120 causes some or all of the agent function units 150 to start reception of the utterance from the occupant of the vehicle M (Step S18). When the common command operation has been detected, an agent which has started-up last may start-up preferentially. Here, the process of this flowchart ends.

Figure 8:
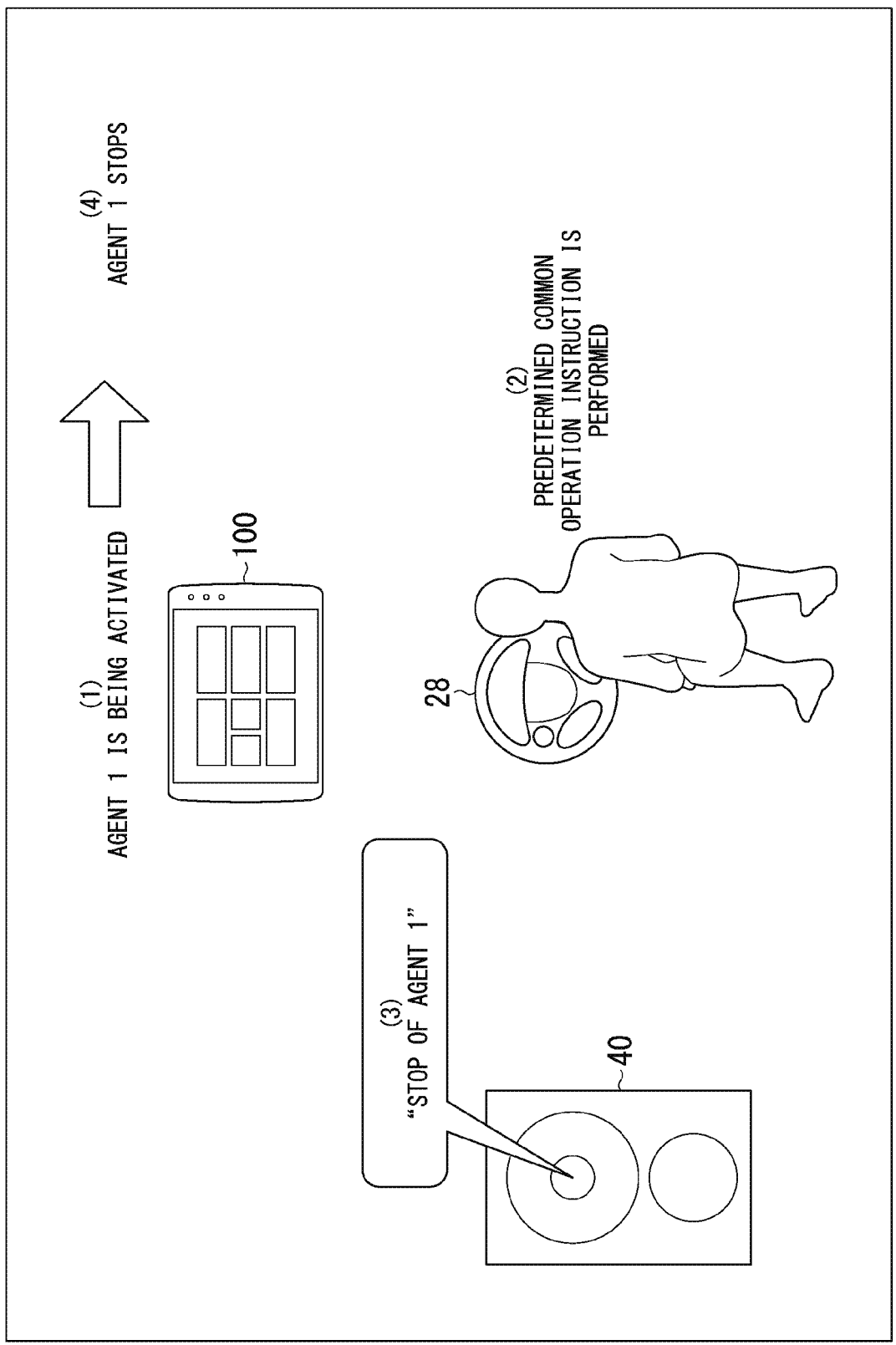
FIG. 8 is a diagram for explaining an operation of an agent device according to an embodiment.

FIG. 8 is a diagram for explaining an operation of the agent device 100 according to the embodiment.

(1) When Agent 1 is being activated, (2) if the occupant of the vehicle M performs a predetermined common command operation, (3) voice of a sleep word corresponding to Agent 1 is output from the speaker unit 40. Thus, the voice of the sleep word output from the speaker unit 40 is input to the agent device 100. (4) Furthermore, the agent device 100 stops the function of Agent 1 corresponding to the sleep word by recognizing the sleep word input from the speaker unit 40.

According to the agent device 100 relating to the embodiment described above, it is possible to improve operability. For example, it is assumed that an individual termination method is set for each of the plurality of agent function units 150. In this case, the occupant of the vehicle M needs to grasp not only any agent function unit 150 which is being activated among the plurality of agent function units 150, but also a termination method corresponding to the agent function unit 150 which is being activated. For this reason, particularly, when the number of agent function units 150 to start-up is large, the occupant of the vehicle M needs to perform a complicated operation to terminate the agent function unit 150 which is being activated. On the other hand, the agent device 100 according to the embodiment stops the function of the agent function unit 150 which is being activated through the same operation among the plurality of agent function units 150 even when an individual termination method is set for each of the plurality of agent function units 150. For this reason, it is possible to improve the operability at the time of stopping the function of the agent function unit 150 which is being activated.

According to the agent device 100, it is possible to further improve operability. For example, when an operation unit configured to stop the functions of the agent function units 150 is separately provided, an operation for terminating the agent function unit 150 which is being activated is even more complicated by an amount of increase of the number of operation units to be operated. On the other hand, in the agent device 100 according to the embodiment, the steering switch 28 used for performing various operations during driving of the vehicle M is used as an operation unit configured to stop the functions of the agent function units 150. For this reason, it is not necessary to separately provide an operation unit configured to stop the functions of the agent function units 150 and it is possible to further improve the operability at the time of stopping the function of the agent function unit 150 which is being activated. Particularly, in the agent device 100 according to the embodiment, the steering switch 28 associated with the utterance with the occupant of the vehicle M is used as an operation unit configured to stop the functions of the agent function units 150. For this reason, the occupant of the vehicle M can stop the function of the agent function unit 150 which is being activated through an intuitive operation.

Although the aspects for carrying out the present invention have been described above using the embodiment, the present invention is not limited to the embodiment and can have various modifications and substitutions without departing from the gist of the present invention.

What is claimed is:

1. An agent device, comprising:
   a plurality of agent function units, in which each of the agent function units individually provides a service including a voice response to an occupant of a vehicle in response to an utterance of the occupant; and
   a manager which, when any of the plurality of agent function units is being activated and a predetermined operation is performed by the occupant of the vehicle, stops the agent function unit which is being activated,
   wherein the predetermined operation is an operation for instructing only stopping of the any of the plurality of agent function units when the any of the plurality of agent function units is being activated,
   wherein individual sleep words are set for each of the plurality of agent function units, and
   wherein when the predetermined operation is performed by the occupant of the vehicle, the manager causes a voice controller to synthesize the sleep words associated with the agent function unit which is being activated and to output the synthesized sleep words through a speaker so that the agent function unit which is being activated stops.

2. The agent device according to claim 1,
   wherein the manager sets some or all of the plurality of agent function units to be in a state in which the some or all of the plurality of agent function units are able to receive the occupant's utterance when none of the plurality of agent function units are being activated and the predetermined operation has been performed by the occupant of the vehicle.

3. The agent device according to claim 1,
   wherein the predetermined operation includes operating a physical operation unit in a vehicle compartment of the vehicle.

4. The agent device according to claim 3,
   wherein the operation unit is provided in a steering wheel of the vehicle.

5. The agent device according to claim 1,
wherein the vehicle has a display unit configured to display an image associated with the agent function unit which is being activated.

6. A method for controlling an agent device causing a computer
to start-up any of a plurality of agent function units;
to provide a service including a voice response, as a function of an agent function unit of the plurality of agent function units which has been started-up, in accordance with an utterance of an occupant of a vehicle; and
to cause the agent function unit which has been started up to stop when any of the plurality of agent function units is being activated and a predetermined operation is performed by the occupant of the vehicle,
wherein the predetermined operation is an operation for instructing only stopping of the any of the plurality of agent function units when the any of the plurality of agent function units is being activated,
wherein individual sleep words are set for each of the plurality of agent function units, and
wherein when the predetermined operation is performed by the occupant of the vehicle, the manager causes a voice controller to synthesize the sleep words associated with the agent function unit which is being activated and to output the synthesized sleep words through a speaker so that the agent function unit which is being activated stops.

\* \* \* \* \*